United States Patent [19]

Marianu

[11] Patent Number: 4,598,800

[45] Date of Patent: Jul. 8, 1986

[54] AUTOMATIC ADJUSTING DEVICE FOR A DISC BRAKE

[75] Inventor: Vlad Marianu, Kelkheim-Fischbach, Fed. Rep. of Germany

[73] Assignee: ITT Industries, Inc., New York, N.Y.

[21] Appl. No.: 656,778

[22] Filed: Oct. 1, 1984

[30] Foreign Application Priority Data

Oct. 5, 1983 [DE] Fed. Rep. of Germany ....... 3336119

[51] Int. Cl.$^4$ .................... F16D 55/26; F16D 65/38
[52] U.S. Cl. .................................. 188/71.9; 188/72.6; 188/106 F; 188/196 D
[58] Field of Search ................ 188/71.9, 71.8, 72.6, 188/106 F, 196 D, 196 C, 196 B, 196 BA, 196 V, 71.2, 79.5; 192/111 A

[56] References Cited

U.S. PATENT DOCUMENTS

| 3,442,357 | 5/1969 | Farr | 188/71.9 X |
|---|---|---|---|
| 3,488,687 | 1/1970 | Farr | 188/71.9 X |
| 3,653,470 | 4/1972 | Travis | 188/72.6 X |
| 3,783,981 | 1/1974 | Burgdorf | 188/106 F |
| 3,952,845 | 4/1976 | Asquith | 188/71.9 X |
| 4,378,863 | 4/1983 | Baum | 188/71.9 X |

FOREIGN PATENT DOCUMENTS

| 2143575 | 3/1973 | Fed. Rep. of Germany | 188/71.9 |
| 2507012 | 8/1975 | Fed. Rep. of Germany | 188/71.9 |

Primary Examiner—Douglas C. Butler
Attorney, Agent, or Firm—James B. Raden; Donald J. Breh

[57] ABSTRACT

An automatic adjusting device for a hydraulically and mechanically actuatable disc brake is disclosed including an adjusting member interposed between a brake piston and a mechanical actuating device. The adjusting member includes an adjusting nut connected to the brake piston by a non-self locking threaded element and includes a conical friction surface cooperating with a friction surface on a hand brake piston. A stop on an axially adjustable sleeve supports the adjusting nut and provides for adjustment of the spacing between the friction surfaces in the inactuated position.

14 Claims, 1 Drawing Figure

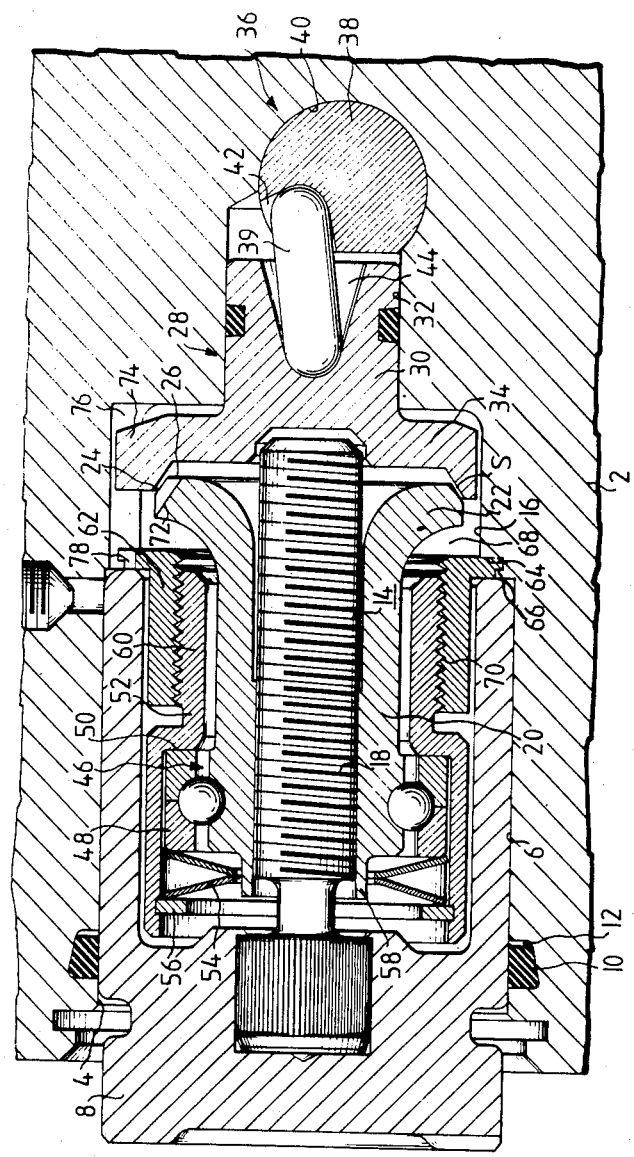

AUTOMATIC ADJUSTING DEVICE FOR A DISC BRAKE

BACKGROUND OF THE INVENTION

The present invention relates to an automatic adjusting device for a disc brake.

A like adjusting device is known from German printed and published patent application 21 43 575 and its counterpart U.S. Pat. No. 3,783,981 issued Jan. 8, 1974 to J. Burgdorf. In this known adjusting device, the adjusting nut is of an outwardly stepped design. Arranged on the step is an axial bearing which is urged by a helical spring against the nut; the other end of the helical spring bears against a sleeve-shaped stop that is formed fast with the housing. At its end remote from the brake piston, the adjusting nut abuts on a second axial bearing which takes support on the bottom of the cylinder bore. In this arrangement, a hand brake clearance remains between a cone surface disposed at the adjusting nut and a hand brake piston which is part of the mechanical actuating device.

Admittedly, this known adjusting device operates generally satisfactorily. It entails, however, a quite complicated design inasmuch as two axial bearings are required. Moreover, due to the arrangement of these two bearings, the space available radially is confined so that the friction clutch can only have a relatively small diameter which may impair the reliability of force transmission.

SUMMARY OF THE INVENTION

It is therefore an object of the present invention to improve upon an adjusting device of the type referred to such that it is of simpler design and, in particular, allows smaller dimensions in a radial direction.

This object will be achieved inventively by the features of the invention. The present inventive solution provides an adjusting device wherein there is need for only one single antifriction bearing. As a result, relatively more space is available at the clutch, enabling the force-transmitting surfaces of the clutch to have a large diameter. In this way the reliability of force transmission is considerably increased and enhanced.

According to advantageous embodiments of this invention, the inner bearing ring of the antifriction bearing is formed by the adjusting nut itself, while the outer bearing ring is of divided design.

To obtain a particularly compact design, it will be expedient to use cup springs or a cup spring assembly as the bias member. (The use of a helical spring is also possible.) The cup springs preferably can be located on a cylindrical projection of reduced diameter on the adjusting nut, thereby gaining the space required in a radial direction for the spring stroke.

Another favorable embodiment provides that in an arrangement, wherein a stop for the nut is formed fast with the housing there is a sleeve that can be inserted between the piston and the adjusting nut, the sleeve adapted to be coupled to the housing. In this way, the sleeve accommodates a radially inwardly protruding ring clip against which the spring abuts.

Expediently, the fastening end of the sleeve comprises a radially extending flange which is seated in a groove of the housing and is coupled to the housing by means of a pinch engagement.

Further embodiments may provide that the stop formed fast with the housing is axially adjustable for the purpose of clearance adjustment. To this end, there is suitably provided two sleeve parts which are interconnected through a thread mating.

BRIEF DESCRIPTION OF THE DRAWING

The single FIGURE of the drawing shows a longitudinal cross-sectional view of part of a disc brake, wherein one side of the brake is illustrated the side shown being without pad and without disc.

DETAILED DESCRIPTION

As shown in the drawing, a brake housing 2 is furnished with a cylinder bore 4 which is substantially stepped twice. In the bore portion 6 of largest diameter, a brake piston 8 is contained axially slidably. The brake piston 8 is of bowl-type design, its open end being located in the cylinder bore 4, while its closed end projects from the cylinder bore 4 to press against a (non-illustrated) brake shoe. With a view to sealing the brake piston 8 in relation to the cylinder bore, a rollback seal 10 is arranged in an annular groove 12 of the brake housing 2, the seal 10 effective also in resetting of the brake piston 8.

Fitted to the bottom of the brake piston 8 in a torsionally secured manner is an adjusting spindle 14 which extends coaxially through the hollow space formed by the brake piston into a bore portion 16 of reduced diameter. The adjusting spindle 14 comprises a steep thread 18 without self-locking engagement. A corresponding thread is included in an adjusting nut 20 disposed on the adjusting spindle 14. The adjusting nut is substantially of cylindrical configuration, and has as its end remote from the piston a radial projection 22 which forms a conical friction surface 24. In a special design which is not shown herein, the cylindrical main body and the projection 22 may be of bipartite design, the two parts of which may be interconnected.

Coacting with said conical friction surface 24 is another conical friction surface 26 which is provided on the housing of hand brake piston 28. The hand brake piston 28 is composed of a cylindrical portion 30 which is arranged to slide into a reduced-diameter bore portion 32, and of a flange portion 34 which extends substantially radially and adjacent the end of which the friction surface 26 is located. The flange portion 34 of the hand brake piston 28 encompasses the radial projection 22 of the adjusting nut 20 from the outside, the hand brake clearance S remaining between the friction surfaces 24 and 26. The friction surface 24 at the nut 20 contains through-recesses 72 which serve for venting and also cause an interruption of lubricating film.

In addition to the hand brake piston 28, the mechanical actuating device further includes an eccentric device 36 which acts via a tappet 39 on the hand brake piston 28. The eccentric device 36 comprises a shaft 38 which is rotatably supported in a bore 40 extending transversely to the cylinder bore 4, and to which a hand brake lever is fitted (not shown). Contained in the shaft 38 is a recess 42 in which an end of the tappet 39 is arranged. The other end of the tappet is located in a conical recess 44 contained in the hand brake piston 28. The hand brake piston 28 is held by means of a torsion-preventing mechanism which, in this case, is composed of at least one radial projection 74 at the hand brake piston, which projection extends into a recess 76 in the housing.

The part of the adjusting nut 20 that faces the brake piston 8 carries a four-point contact bearing 46 or a three-point contact bearing, the inner bearing ring of which is formed by the adjusting nut 20 itself. The outer bearing ring 48 of the antifriction bearing 46, which ring is divided into two parts along a plane that extends vertically to the axis of rotation, abuts on a shoulder 50 of a sleeve 52 which is secured in the brake housing 2 and which extends in an axial direction between the adjusting nut 20 and the wall of the brake piston 8. Bearing against the other side of the outer bearing ring 48 is a cup spring 54 which is part of a spring assembly that is supported on a ring 56 seated in an internal groove of the sleeve 52. The cup spring 54 is arranged around an axial projection 58 of the adjusting nut 20 spaced radially therefrom and is guided at its outer periphery in the sleeve. Instead of cup springs, it is also possible to use a helical spring. In this event, it would be expedient to place the roller bearing axially farther towards the clutch. Inventively, there is provision of a free space between the outer periphery of the bearing 46 and the sleeve 52 to enable either approach to be implemented.

Sleeve 52 incorporates a substantially cylindrical stepped portion 60 and a flange portion 62, the latter serving to fasten the sleeve 52 in the housing 2 and containing at its outer periphery at least one slot 78. To this end, the housing is furnished with an annular groove 64, into which part of the flange portion 62 protrudes. Securement of the flange portion 62 in the groove 64 is performed by means of a pinch or caulking engagement 66. Sleeve 52 can be of one-part design; however, it can also be advantageously of two-part design, as is illustrated in the drawing. In the latter case, the sleeve parts are expediently interconnected via a thread 70, whereby a relative movement of these parts in an axial direction is enabled for the compensation of manufacturing tolerances. This permits a simple adjustment of the hand brake clearance S, after which the two sleeve parts may be fixed axially by deformation or by gluing, for instance.

The operation of the subject matter of this invention is as follows: During each normal hydraulic braking operation during which the brake fluid enclosed in the chamber 68 within the brake housing 2 by the brake piston 8 is acted upon by pressure, the brake piston 8 moves forward and backward. In this way, the adjusting spindle 14 is first turned somewhat out of the adjusting nut 20 and then returned into the nut again.

If hand braking is desired to be performed, the eccentric shaft 38 will be twisted counterclockwise mechanically by the hand brake lever, (not shown) as a result of which the hand brake piston 28, after having overcome the clearance S, will be brought into abutment with its friction surface 26 on the opposed friction surface 24 of the adjusting nut 20 and will thus be torsionally locked. The adjusting nut 20 is moved in the direction of the brake disc in opposition to the force of the springs 54, while both the brake piston 8 and the hand brake piston 28 are held in a torsionally secured manner by virtue of the friction surfaces, because otherwise there might occur a relative torsional movement between the adjusting nut 20 and the adjusting spindle 14 which is not desirable in the event of hand brake actuation.

On termination of the hand brake actuation, the adjusting nut 20 will be urged by the springs 54 via the antifriction bearing 46 to re-assume its initial position, the outer bearing ring 48 of the antifriction bearing moving into abutment on the shoulder 50 of the sleeve 52. By this action, the hand brake clearance S arranged between the adjusting nut 20 and the hand brake piston 28 will be re-established, since likewise the hand brake piston 28 will be moved back into its initial position.

Resetting of the adjusting device will be accomplished in that the brake piston 8, as is the case with a brake caliper without hand brake, is urged back by means of a tool. Upon this action, the adjusting nut 20 twists on the adjusting spindle 14 and moves into its original start position again; the brake piston 8 will not be twisted then.

What is claimed is:

1. An automatic adjusting device for a disc brake of the type including a brake piston slidably mounted in a brake cylinder in a housing adapted to actuate a brake shoe in which said brake piston is actuatable by a hydraulic and a mechanical actuating device comprising:
   an adjusting nut having a coaxial threaded bore, said adjusting nut mounted to said brake piston for coaxial extension relative to said brake piston by a threaded member fixedly secured at one end to said brake piston and including a thread received in said threaded bore, said thread being of a steep, non-self locking type, said adjusting nut further including a first friction surface at one end;
   a hand brake piston slidably mounted in said housing coaxial with said adjusting nut, said hand brake piston operatively connected to said mechanical actuating device and including a second friction surface adjacent to and spaced from said first friction surface in an unactuated mode of said mechanical actuating device, said first and second friction surfaces defining a friction clutch for engaging and frictionally restraining said adjusting nut against torsional movement when said mechanical actuating device is actuated;
   a sleeve fixedly mounted to said housing and disposed around said adjusting nut between said adjusting nut and said brake piston;
   one antifriction bearing mounted between said sleeve and said adjusting nut;
   a spring within said sleeve supported on one side by a first stop on said sleeve biasing said bearing onto said adjusting nut against a second stop on said sleeve; and
   means for adjusting the spacing between said first and second friction surfaces.

2. An automatic adjusting device as claimed in claim 1 wherein an inner bearing ring of the antifriction bearing member is defined by the adjusting nut.

3. An automatic adjusting device as claimed in claim 1 wherein an outer bearing ring of said antifriction bearing member is divided.

4. An automatic adjusting device as claimed in claim 1, in which the spring comprises a cup spring.

5. An automatic adjusting device as claimed in claim 4, in which the adjusting nut includes at an end adjacent to the brake piston an axially extending cylindrical projection around which the cup spring is arranged.

6. An automatic adjusting device as claimed in claim 1 wherein the first stop is a radially inwardly projecting ring inserted into the sleeve against which the spring bears.

7. An automatic adjusting device as claimed in claim 1 wherein a fastening end of the sleeve comprises a radially extending flange which is inserted into a groove in the housing and which is coupled to the housing by means of a pinch engagement.

8. An automatic adjusting device as claimed in claim 1 wherein the first and second friction surfaces define a conical shape.

9. An automatic adjusting device as claimed in claim 8, wherein at least one of said first and said second friction surfaces includes at least one through-recess.

10. An automatic adjusting device as claimed in claim 1 wherein the hand brake piston includes a radially outwardly extending flange including the second friction surface.

11. An automatic adjusting device as claimed in claim 1, in which the hand brake piston is secured against torsion by a torsion-preventing mechanism.

12. An automatic adjusting device as claimed in claim 11, in which the torsion-preventing mechanism includes at least one projection on the hand brake piston, said projection engages in at least one recess in the housing.

13. An automatic adjusting device as claimed in claim 1, wherein said means for adjusting the spacing between said first and second friction surfaces comprises means for axially adjusting the position of said first stop.

14. An automatic adjusting device as claimed in claim 1, wherein said means for adjusting the spacing between said first and second friction surfaces includes said sleeve including a first sleeve part affixed to said housing and a second sleeve part threadedly coaxially attached to said first sleeve part, said first and second stop associated with said second sleeve part, whereby said adjusting nut is axially positionable relative to said hand brake piston.

* * * * *